United States Patent [19]

Fan

[11] Patent Number: 5,513,488
[45] Date of Patent: May 7, 1996

[54] POWER PROCESS UTILIZING HUMIDIFIED COMBUSTED AIR TO GAS TURBINE

[75] Inventor: Zhen Fan, Parsippany, N.J.

[73] Assignee: Foster Wheeler Development Corporation, Livingston, N.J.

[21] Appl. No.: 359,270

[22] Filed: Dec. 19, 1994

[51] Int. Cl.⁶ ........................................ F02C 3/30
[52] U.S. Cl. .......................... 60/39.05; 60/39.59
[58] Field of Search .............. 60/39.05, 39.511, 60/39.53, 39.59, 728

[56] References Cited

U.S. PATENT DOCUMENTS

| | | | |
|---|---|---|---|
| 3,657,879 | 4/1972 | Ewbank et al. | 60/39.05 |
| 3,788,066 | 1/1974 | Nebgen | 60/728 |
| 4,653,268 | 3/1987 | Nakamura et al. | 60/39.53 |
| 4,829,763 | 5/1989 | Rao. | |
| 5,148,668 | 9/1992 | Frutschi. | |
| 5,160,096 | 11/1992 | Perkins et al.. | |
| 5,181,376 | 1/1993 | Rao. | |
| 5,201,796 | 4/1993 | Glinski et al.. | |
| 5,218,815 | 6/1993 | Korenberg. | |
| 5,379,589 | 1/1995 | Cohn et al. | 60/39.59 |

Primary Examiner—Louis J. Casaregola
Attorney, Agent, or Firm—Charles L. Willis

[57] ABSTRACT

A process for producing mechanical power utilizing compressed and humidified hot air and a fuel, which are mixed together and combusted and the resulting hot combustion gas is expanded through a gas turbine. The air is initially compressed and intercooled against a water stream, and then further compressed and passed directly to a heat recovery unit where it is humidified using the water from the compressed air intercooling step. The compressed humidified air is further heated against hot turbine exhaust gas and combined with a fuel in a combustor, and the resulting hot combustion gas is expanded through a gas turbine to produce mechanical power needed for driving the air compression. The hot turbine exhaust gas is cooled countercurrently against the compressed humidified air stream and against the water stream, and then discharged to the atmosphere. By eliminating a usual separate air aftercooling and saturator unit upstream of the air combined humidifying and heating step, process thermal efficiency for the present process is increased and equipment cost reduced.

7 Claims, 4 Drawing Sheets

5,513,488

POWER PROCESS UTILIZING HUMIDIFIED COMBUSTED AIR TO GAS TURBINE

BACKGROUND OF INVENTION

This invention pertains to a process for producing mechanical power by utilizing compressed humidified air and a fuel to produce hot combustion gas for expansion in a gas turbine. It pertains particularly to such a power producing process in which hot compressed air is humidified with heated water and the mixture further heated in a heat recovery unit provided upstream of a fuel combustor and hot gas turbine.

Processes for producing mechanical power by utilizing a gas turbine for expanding a pressurized hot combustion gas and recovering heat from turbine hot exhaust gas are well known. Some recent such processes provide for water saturation of compressed hot air before the humidified air is utilized for fuel combustion and expansion through a hot gas turbine, which results in requiring less excess air and improved thermal efficiency and lower power costs. Such processes for producing power utilizing humidified air supply to a fuel combustor and hot gas turbine are disclosed by U.S. Pat. Nos. 4,829,763 and 5,181,376 to Rao. U.S. Pat. No. 5,160,096 to Perkins et al discloses a gas turbine cycle in which compressed humidified air is used to cool the turbine stationary blading. Also, U.S. Pat. No. 5,201,796 to Glinski et al and U.S. Pat. No. 5,218,815 to Korenberg each disclose gas turbine power processes in which compressed air is humidified upstream of a fuel combustor to assist in supplying oxygen and controlling temperature of the combustion before the hot gas is expanded in the gas turbine. However, these known power producing processes are relatively complex and have various limitations, so that further improvements and simplification in such gas turbine power producing cycles utilizing pressurized humidified air supply to the fuel combustion step and gas turbine are desired.

SUMMARY OF INVENTION

The present invention provides an improved gas turbine power producing process which utilizes compressed heated air which is humidified and further heated and mixed with fuel in a combustor, and the resulting hot combustion gas is expanded in a gas turbine. In the process, the air is first compressed and intercooled, and the air is further compressed and heated in a combined saturator and heat recovery unit, in which the air is mixed with a heated water stream to achieve saturation before feeding the hot saturated air with a fuel to a combustor. The hot water is usually spray mixed into the hot compressed air stream, and the temperature of the water at the spray mixing point can be varied as desired to achieve maximum thermal efficiency for the process. The resulting pressurized hot combustion gas is then expanded through a gas turbine to produce mechanical power, and the hot expanded gas is passed back through the heat recovery unit countercurrently to heat the humidified air and saturating water, after which the cooled exhaust gas is discharged through an exhaust stack to the atmosphere.

This invention advantageously provides a power producing process having increased thermal efficiency and reduced investment costs. Because this new power producing process does not utilize a compressor aftercooler and separate saturator unit with its associated water circulation system for the compressed air, the compressed air heating and humidification steps are combined to provide countercurrent heating and humidification, and the overall thermal efficiency for the process is increased. Also, the capital cost for process equipment is correspondingly reduced.

BRIEF DESCRIPTION OF DRAWINGS

This invention will be further described with reference to the following drawings, in which.

DESCRIPTION OF INVENTION

Figure 1:
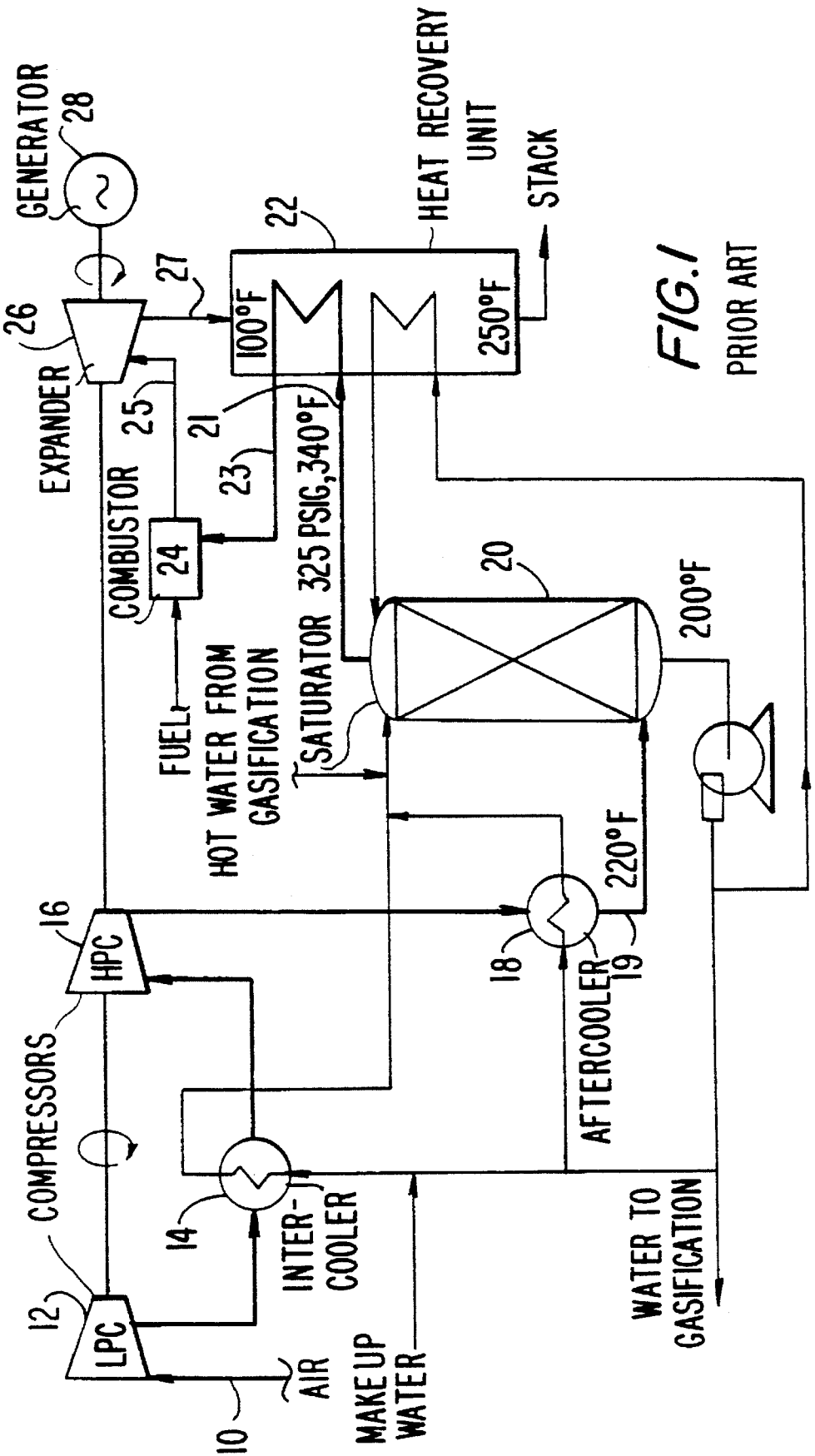
FIG. 1 is a flow diagram of a known power producing cycle utilizing a separate saturator unit for providing compressed humidified air to a heat recovery unit, fuel combustor and gas turbine.

The process and advantages of the present invention will be best understood when its features are compared with a known power process in which compressed and humidified air is utilized in a gas turbine cycle. As shown in FIG. 1, air at 10 is first compressed in a low pressure compressor unit 12 and cooled in intercooler 14 against a water stream, and then is further compressed in a high pressure compressor unit 16 and again cooled against water in aftercooler 18. The resulting compressed air at 19 is humidified in a saturator unit 20 with hot water from the air intercooling step at 14 and aftercooling step at 18. This humidified air at 21 is then superheated to about 1000° F. in heat recovery unit 22 against gas turbine exhaust gas stream 27. The humidified air at 23 is mixed with a fuel and combusted in combustor 24 and expanded in gas turbine 26, with the resulting hot exhaust gas 27 from gas turbine 26 being passed through the heat recovery unit 22, where heat from the exhaust gas is used to heat the air stream 23 to the fuel combustor 24. Also, a water recycle system provides for the water circulation to the saturator 20 and remove additional heat from the gas turbine exhaust gas 27 in recovery unit 22. Thus, this known power process utilizes a separate aftercooler 18 and separator saturator 20 for providing the humidified air at 21 upstream of the heat recovery unit 22.

Figure 2:
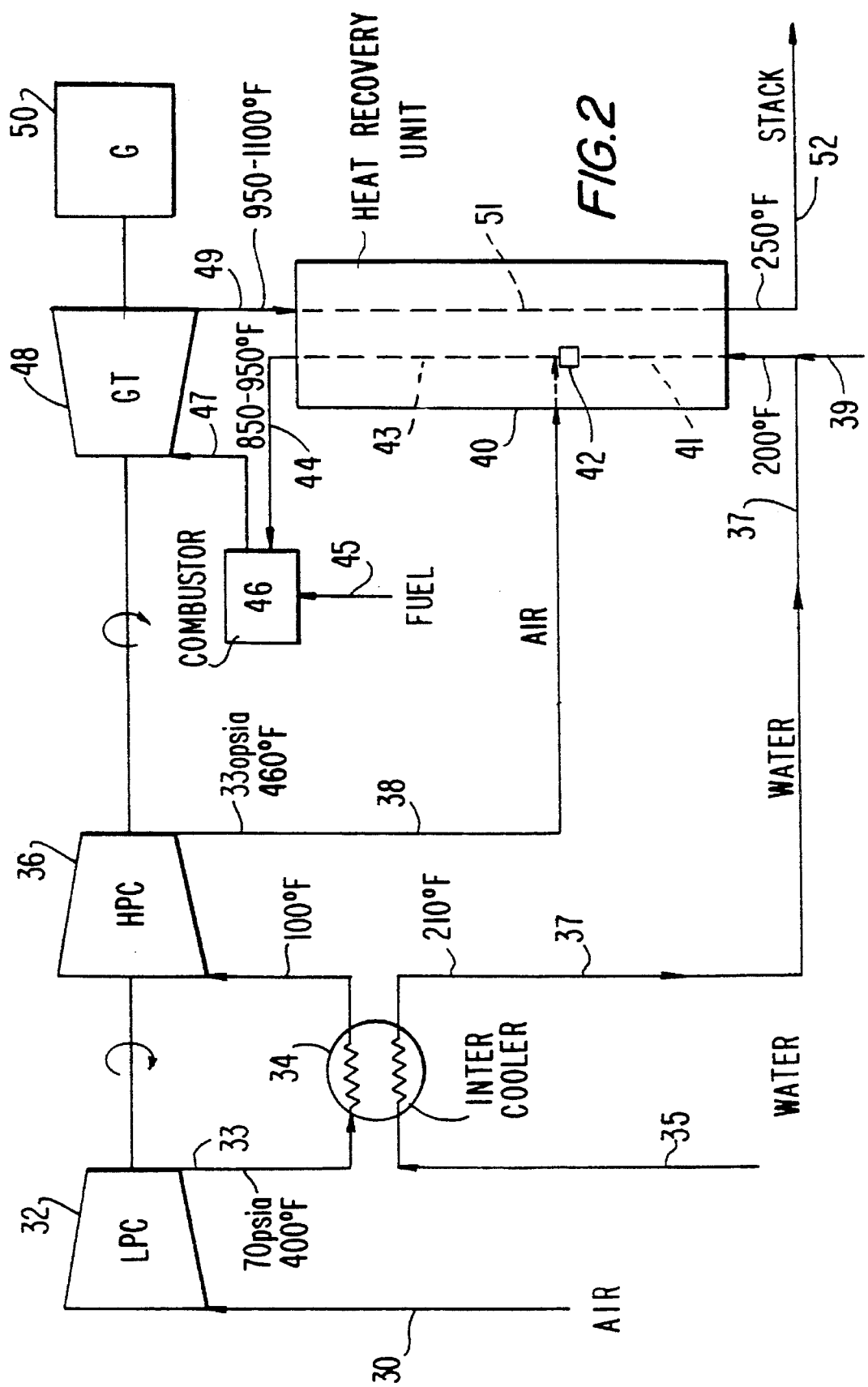
FIG. 2 shows a flow diagram of a power producing process according to the present invention, utilizing a modified arrangement for providing compressed humidified hot air and fuel to a combustor and utilizing gas turbine hot exhaust gas for heating the compressed humidified air and water streams.

In significant contrast to the known power process per FIG. 1, the improved power process design according to the present invention modifies and improves the known humidified air gas turbine cycle. As shown in FIG. 2, air supply at 30 is compressed in low pressure compressor unit 32 to 70–80 psia pressure and 400°–420° F. temperature, and the compressed air at 33 is then cooled at intercooler 34 to about 100° F. against a water stream provided at 35. The cooled air is further compressed in high pressure compressor unit 36 to 300–330 psia and 450°–460° F., after which the hot compressed air at 38 is passed directly to a combined saturator and heat recovery unit 40, where it is mixed and humidified with heated water stream 37 from the intercooler 34. Such mixing of the compressed air and water streams is provided by a spray nozzle 42 by which the pressurized heated water stream 41 is sprayed into compressed air stream 38 to provide humidified air stream 43. Although the spray nozzle 42 may be located external to the heat recovery unit 40, it is preferably located within the heat recovery unit 40 to provide countercurrent humidification of the compressed air for improved thermal efficiency. The resulting compressed and humidified air stream at 43 is further heated to 850°–950° F. against hot gas turbine exhaust gas flowing in passageway 51. An additional pressurized water stream is provided at 39 as needed to supplement the cooling water stream 37 and provide desired humidification of the air stream 43.

The resulting compressed and humidified air at 44 is at 850°–950° F. temperature and is fed together with a fuel provided at 45, such as natural gas or oil, to combustor 46 for producing a hot combustion gas at 47. The supplemental water stream 39 and amount of humidification of the compressed air stream 43 is controlled so that the temperature of the hot combustion gas at 47 does not exceed about 2000° F. This hot combustion gas at 47 is expanded through gas turbine 48 to produce mechanical power for driving the two staged air compressor units 32 and 36, which power may also be used to drive an electric power generator 50.

From the gas turbine 48, hot exhaust gas at 49 having 950°–1100° F. temperature is passed back through the heat recovery unit 40 in passageway 51 to heat both the compressed air-water stream 43 and the saturating water streams 37 and 39 in the passageway 41. The cooled exhaust gas at 52 at about 250° F. temperature is then discharged through a stack (not shown) to the atmosphere.

Figure 3:
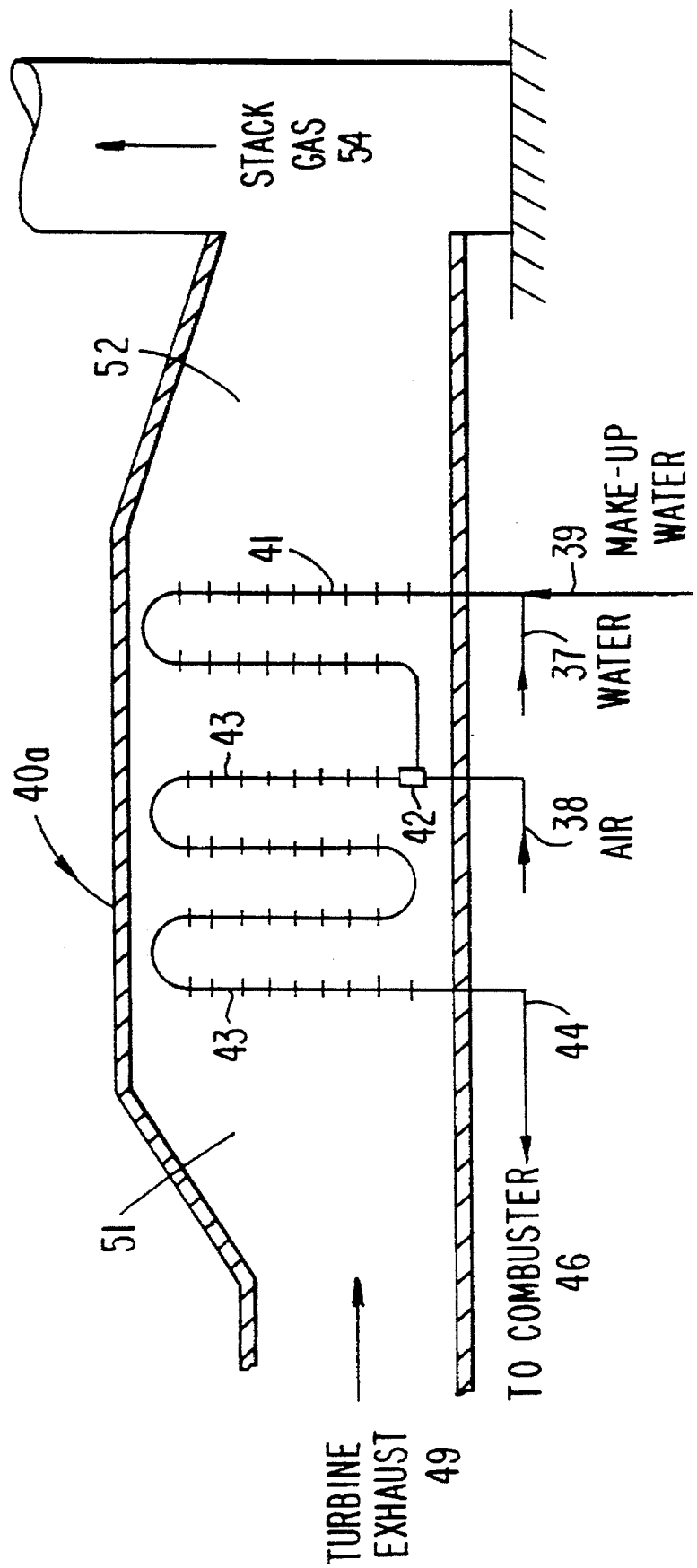
FIG. 3 shows an enlarged schematic flow diagram of the saturator and heat recovery unit utilized in the process.

The combined saturator and heat recovery unit 40 will usually be provided with a horizontal thermally-insulated casing 40a containing a plurality of vertically-oriented finned tubes through which the water stream at 41 and the compressed air-water mixture at 43 are passed, as shown in more detail by FIG. 3. The water stream in passageway 41 is injected into air stream passageway 43 by spray nozzle 42. The hot turbine exhaust gas stream is passed through the casing passageway 51 to countercurrently heat and humidify the air-water stream 43 and heat water steam 41, after which the cooled turbine exhaust gas is passed through passageway 52 to the stack 54.

A significant difference between the known prior power process and the present process is that the known power process per FIG. 1 utilizes a multi-stage saturator unit to humidify the compressed air, in which unit the water is evaporated at relatively low temperatures. However, the present design process per FIG. 2 uses an integral air-water mixing and water evaporation step, in which the water boiling temperature increases during the compressed air humidification step. This increasing varying temperature evaporation of the saturating water is thermodynamically superior to the generally constant temperature boiling step utilized by the prior art by reducing the lost work, which difference can be understood from reference to a temperature-entropy (T-S) diagram.

As shown in FIG. 2, for the present power process design the high pressure compressor unit 36 does not require or utilize an aftercooler or a saturator unit, together with their associated water circulating system. Instead, the compressed hot air stream at 38 is fed directly to the saturator and heat recovery unit 40, where the compressed air is mixed with heated water in passageway 41 by the spray nozzle 42. The water stream 37 which is preheated at the intercooler 34 together with make-up water at 39 is further heated in heat recovery unit 40, after which it is mixed with the compressed hot air stream 38. The two-phase air-water mixture passes through the heat recovery unit 40, where the water is evaporated and the air-vapor mixture is superheated. The location of the spray nozzle 42 can be varied relative to passageways 41 and 43 to achieve the most favorable temperature pattern and highest thermodynamic efficiency for the process. The resulting hot compressed and humidified air stream at 44 is mixed with a fuel 45 which is burned in the combustor 46. The compressed humidified air at 44 serves to limit the combustion gas temperature from the combustor 46 to not exceeding about 2000° F.

The present power process design per FIG. 2 provides significant advantages compared with the known humidified air gas turbine power processes. Because this new design process does not require an aftercooler and saturator units and the water circulating system, capital cost for the process equipment is reduced. Also, as the known process uses circulation water as the heat carrying agent, three driving forces of temperature are required: (1) heat transfer between the hot exhaust gas and recycle water at the heat recovery unit, (2) exit water to inlet air at the saturator, and (3) hot water to exit humidified air at the saturator. However, the present process design does not need consideration of these temperature driving forces, as the water is directly fed to the heat recovery unit 40, so that the air humidification and heating therein is thermodynamically more efficient, and the exhaust gas temperature at stack 54 can be advantageously reduced to a lower level. For this reason, less heat is rejected from the present process and the overall thermal efficiency of the process is correspondingly and desirably increased.

Figure 4:
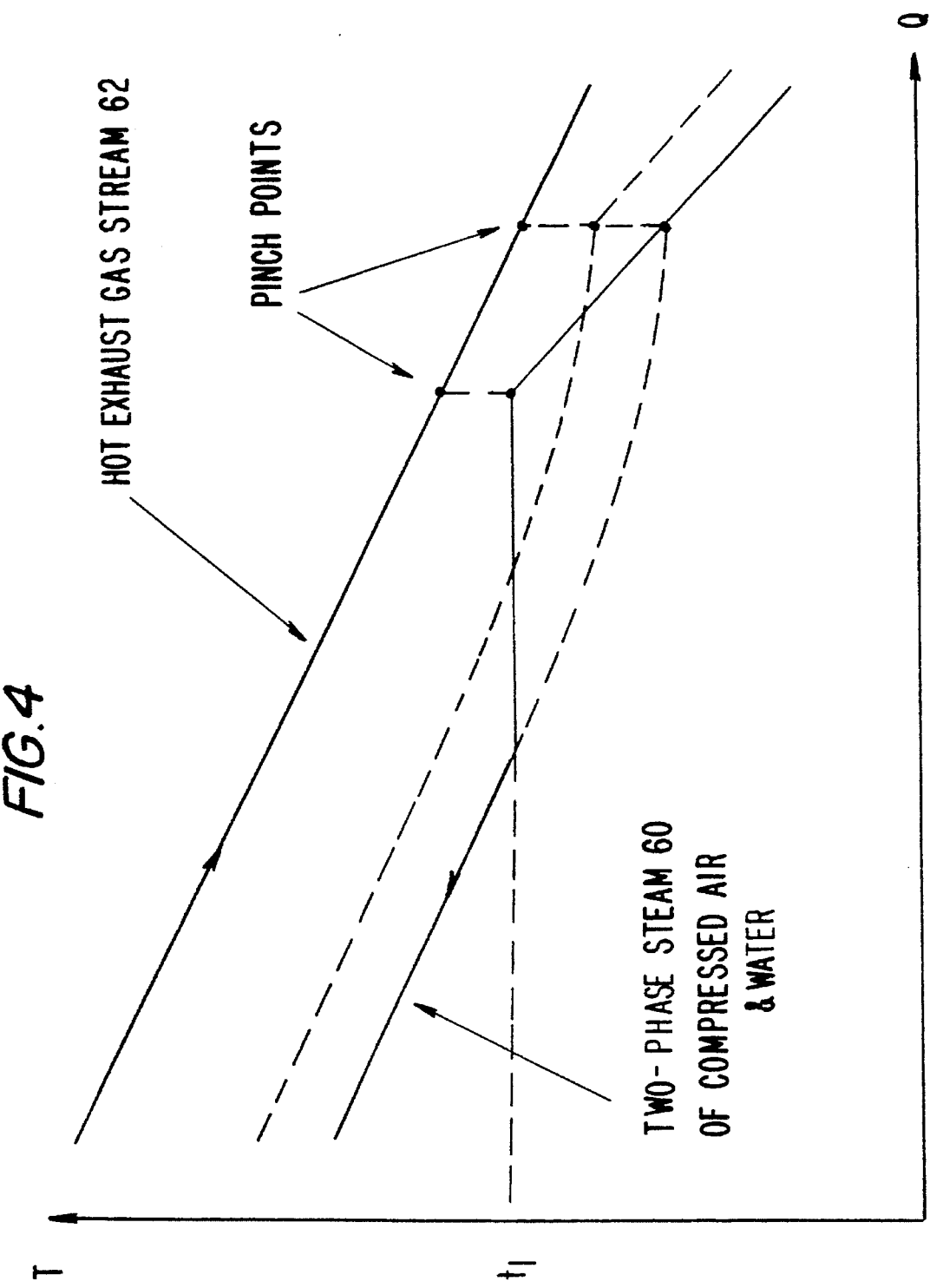
FIG. 4 generally depicts a temperature-heat transfer diagram of the two-phase air-water stream being heated by the hot turbine exhaust gas stream in the combined air humidification and heat recovery unit.

As the known power process per FIG. 1 uses a separate saturator unit, it has limitations on the hot water temperature, on the degree of saturation of the air, and on the water content in the hot humidified air. But the present process design removes these limitations so that the hot compressed air from the second stage of air compression at 36 is utilized directly for water heating and evaporation, also in combination with heat from exhaust gas stream 51. This arrangement results in more complete air saturation, so that compressed heated air at 44 having higher humidity can be provided to the combustion step at 46 to reduce excess air quantity otherwise needed and thereby save compressor work. This improvement is further illustrated in FIG. 4, which is a simplified temperature-heat transfer (T-Q) diagram in which lower line 60 represents the two-phase air-water humidified stream 43 being heated by hot turbine exhaust gas stream represented by upper line 62. It is seen that for the present process the minimum differential temperature ($\Delta T$) pinch point occurs at a higher temperature during countercurrent heating and humidification and is smaller than that for the known power cycle per FIG. 1. For these reasons, the thermal efficiency of the present process is further increased. Thus, the present design power process desirably provides an unexpected higher thermal efficiency and lower capital costs.

This improved power producing process utilizing compressed humidified air to a combustor and gas turbine will be further described by the following example, which should not be construed as limiting in scope.

EXAMPLE

In a power producing process according to this invention, air is first compressed to an intermediate pressure and intercooled against a water stream. The cooled air is then further compressed and passed directly to a heat recovery unit, where it is humidified using the water stream from the intercooling step and a make-up water steam. The compressed humidified air is further heated countercurrently against gas turbine hot exhaust gas, then mixed with natural gas fuel and combusted. The resulting hot combustion gas is expanded through the gas turbine to produce mechanical power, and the turbine hot exhaust gas is cooled against the compressed humidified air and water streams before the exhaust gas is discharged to atmosphere.

Important characteristics of the present power producing process are as follows:

| First Stage Compression | |
| --- | --- |
| Air discharge pressure, psia | 170 |
| Air discharge temperature, °F. | 400 |
| Air intercooled temperature, °F. | 100 |
| Water temp. after intercooler, °F. | 90 |
| Second Stage Compression | |
| Air discharge pressure, psig | 330 |
| Air discharge temp., °F. | 460 |
| Heat Recovery Unit | |
| Water inlet temp., °F. | 90 |
| Air-water mixing temp., °F. | 410–420 |
| Air temp. to combustion unit, °F. | 900 |
| Gas temp. to turbine, °F. | 1,900 |
| Turbine exhaust gas pressure, psia | 50 |
| Turbine exhaust gas temp., °F. | 1,000 |
| Exhaust gas temp. to atmosphere, °F. | 250 |

Although this invention has been described broadly and in terms of a preferred embodiment, it will be understood that modifications and variations can be made, all within the scope of the invention as defined by the following claims.

I claim:

1. A process for producing mechanical power by combusting a fuel together with compressed humidified air and expanding the resulting hot combustion gas through a gas turbine, comprising:

(a) compressing atmospheric air to a first pressure and cooling the compressed air with an interstage cooling step (34) against a water stream (35) while heating the water stream, then further compressing the air from said first pressure to a second higher pressure and passing the further compressed air (38) directly to a combined saturator and heat recovery unit (40);

(b) contacting the further compressed air (38) with the heated water (37) from said interstage cooling step (34) in said saturator and heat recovery unit (40) at an intermediate location (42) by counter-current heating and humidification to form a pressurized humidified air stream (44);

(c) combusting a fuel (45) in the presence of the humidified air stream (44) in a combustor (46) and producing a hot combustion gas (47);

(d) expanding said hot combustion gas (47) through a gas turbine (48) and thereby providing a hot exhaust gas stream (49) and producing mechanical power; and (e) rejecting heat from the gas turbine hot exhaust gas stream (49) and thereby heating the further compressed air and the heated water by countercurrent heating and humidification in said saturator and heat recovery unit (40), and discharging the cooled turbine exhaust gas (52) from said heat recovery unit to the atmosphere.

2. The power producing process of claim 1, including providing a supplemental water stream (39) to the air saturator and heat recovery unit (40) for mixing with the interstage cooling water stream (37) so as to limit the humidified air (44) temperature to the fuel combustion step (46).

3. The power producing process of claim 1, wherein the heated water (37) from said interstage air cooling step (34) is further heated and spray mixed with the further compressed air (38) in said heat recovery unit (40) to form an air-water mixture stream.

4. The power producing process of claim 1, wherein the mechanical power produced from the gas turbine is used to drive the first pressure stage (32) and second pressure stage (36) of air compression and drive an electric power generator (50).

5. The power producing process of claim 1, wherein the hot combustion gas (47) temperature to the gas turbine (48) does not exceed about 2,000° F.

6. A process for producing mechanical power by combusting a fuel with compressed humidified air and expanding the resulting hot combustion gas through a gas turbine, comprising:

(a) compressing atmospheric air to a first pressure and cooling the compressed air with an interstage cooling step (34) against a water stream (35) and thereby heating the water stream, then further compressing the air from said first pressure to a second higher pressure and passing the further compressed air (38) directly to a combined saturator and heat recovery unit (40);

(b) contacting the further compressed air (38) with the heated water (37) from said interstage cooling step (34) and a supplemental water stream (39) in said combined saturator and heat recovery unit (40) at an intermediate location (42) by counter-current heating and humidification to form a pressurized humidified air stream (44);

(c) combusting a fuel (45) in the presence of the humidified gaseous air stream (44) in a combustor (46) and producing a hot combustion gas (47) having temperature not exceeding about 2,000° F;

(d) expanding said hot combustion gas (47) through a gas turbine (48) and thereby providing a hot exhaust gas stream (49) and thereby producing mechanical power for driving the first and second pressure stages of air compression; and (e) rejecting heat from the gas turbine hot exhaust gas stream (49) and thereby heating the further compressed air and the heated water by countercurrent heating and humidification in said saturator and heat recovery unit (40), and discharging the cooled turbine exhaust gas (52) from said heat recovery unit to the atmosphere.

7. The power producing process of claim 1, wherein said contacting of compressed air stream (38) with heated water (37) is provided by a spray nozzle (42) located within said saturator and heat recovery unit (40).

* * * * *